United States Patent
Nakagawa et al.

(10) Patent No.: US 8,665,153 B2
(45) Date of Patent: Mar. 4, 2014

(54) ARRAY SIGNAL PROCESSING DEVICE

(75) Inventors: Yoichi Nakagawa, Tokyo (JP); Takashi Fukagawa, Kanagawa (JP); Hirohito Mukai, Tokyo (JP)

(73) Assignee: Panasonic Corporation, Osaka (JP)

( * ) Notice: Subject to any disclaimer, the term of this patent is extended or adjusted under 35 U.S.C. 154(b) by 81 days.

(21) Appl. No.: 13/263,964

(22) PCT Filed: Apr. 26, 2010

(86) PCT No.: PCT/JP2010/002979
§ 371 (c)(1),
(2), (4) Date: Oct. 11, 2011

(87) PCT Pub. No.: WO2010/125790
PCT Pub. Date: Nov. 4, 2010

(65) Prior Publication Data
US 2012/0032850 A1    Feb. 9, 2012

(30) Foreign Application Priority Data

Apr. 28, 2009   (JP) ................................. 2009-109478

(51) Int. Cl.
*G01S 3/74*    (2006.01)
*H01Q 21/06*    (2006.01)

(52) U.S. Cl.
USPC ........................... 342/378; 342/445; 342/446

(58) Field of Classification Search
USPC ........................................ 342/378, 445, 446
IPC .......................... G01S 3/14,3/74; H01Q 21/061
See application file for complete search history.

(56) References Cited

U.S. PATENT DOCUMENTS

| | | | | |
|---|---|---|---|---|
| 5,299,148 A | * | 3/1994 | Gardner et al. | 342/378 |
| 6,239,747 B1 | * | 5/2001 | Kaminski | 342/445 |
| 2005/0099674 A1 | * | 5/2005 | Watanabe | 359/330 |
| 2010/0002743 A1 | * | 1/2010 | Markov et al. | 372/96 |

FOREIGN PATENT DOCUMENTS

| | | |
|---|---|---|
| JP | 2004-361377 | 12/2004 |
| JP | 2006-234445 | 9/2007 |

OTHER PUBLICATIONS

English Translation of JP 2004-361377 A.*
Kikuma, "Adaptive Signal Processing by Array Antenna," Kagaku Gijutsu Shuppan, Inc., 31 pages.
International Search Report for Corresponding International Application PCT/JP2010/002979, mailed Aug. 3, 2010.

* cited by examiner

*Primary Examiner* — Jack W Keith
*Assistant Examiner* — Fred H Mull
(74) *Attorney, Agent, or Firm* — Seed IP Law Group PLLC

(57) ABSTRACT

Provided is an array signal processing device capable of, when a spatial averaging method is applied to array signal processing, reducing the number of antennas constituting an array antenna while making use of the spatial averaging method. In the array signal processing device (300), an array antenna (310) comprises four antennas (311-1 to 311-4) disposed at the four vertices of a parallelogram. Correlation calculation units (341-1, 2) calculate, based on a received signal, spatial correlation matrices for respective sub-array antenna (312-1) and sub-array antenna (312-2), the sub-array antenna (312-1) comprising the antennas (311-1, 3) disposed at the opposing two vertices and the antenna (311-2), the sub-array antenna (312-2) comprising the antennas (311-1, 3) and the antenna (311-4). An array rotation unit (342) converts a first spatial matrix of the calculated two spatial matrices to the complex conjugate thereof. A spatial averaging unit (343) averages the complex conjugate of the first spatial matrix and a second spatial matrix.

14 Claims, 8 Drawing Sheets

ARRAY SIGNAL PROCESSING DEVICE

TECHNICAL FIELD

The present invention relates to an array signal processing apparatus.

BACKGROUND ART

The arrival direction ($\phi$, $\theta$) of a wave can be estimated using an array antenna arranged in a planar manner, such as an circular array. Here, $\phi$ represents the azimuth in the same plane (xy plane) as the plane of an array antenna, and $\theta$ represents the elevation when the perpendicular direction to that plane is the z axis.

Further, when detecting each arriving wave component by demultiplexing a plurality of arriving waves having high correlation (coherent) into each arriving wave component, the spatial smoothing technique using a plurality of subarray antennas provided in positions that shift horizontally in space, is effective. This method realizes suppression of correlation between arriving waves by determining the arithmetic mean of correlation matrices obtained in each subarray antenna.

Patent Literature 1 and Non-Patent Literature 1 disclose a method of estimating the arrival direction of a wave while suppressing correlation between coherent waves by applying the spatial smoothing technique to the above-described planar array.

FIG. 1 shows an array antenna disclosed in Patent Literature 1. In FIG. 1, array antenna 10 is formed with five antennas 100-1 to 100-5 that are arranged on a plane. Further, array antenna 10 is configured with subarray antenna 101-1 formed with antennas 100-1 to 3, and subarray antenna 101-2 formed with antennas 100-3 to 5. That is, subarray antenna 101-1 and subarray antenna 101-2 share antenna 100-3.

As is clear from FIG. 1, when being shifted horizontally, subarray antenna 101-1 coincides with subarray antenna 101-2. Therefore, it is possible to employ the spatial smoothing technique for array antenna 10, and it is possible to suppress correlation between arriving waves as described above, by calculating correlation matrices for a reception signal in each of two subarray antennas 101 and determining the arithmetic mean of the obtained two correlation matrices. As a result of this, it is possible to accurately detect respective arrival directions of a plurality of arriving waves having high correlation.

CITATION LIST

Patent Literature

PTL 1
Japanese Patent Application Laid-Open No. 2004-361377

Non-Patent Literature

NPL 1
"Adaptive Signal Processing by Array Antenna," Nobuyoshi Kikuma, Kagaku Gijutsu Shuppan, Inc.

SUMMARY OF INVENTION

Technical Problem

By the way, basically, an array signal processing apparatus that processes a signal received from an array antenna is provided with the same number of processing circuits as the number of antennas forming the array antenna. For this reason, by reducing the number of antennas, it is possible to reduce the circuit size and power consumption.

Therefore, although there is a demand for reduction of circuit size and power consumption for an array signal processing apparatus to which the above-described spatial smoothing technique is applied, it is difficult to use the spatial smoothing technique simply by reducing the number of antennas.

It is therefore an object of the present invention to provide an array signal processing apparatus that can use the spatial smoothing technique and reduce the number of constituent antennas of an array antenna at the same time, when applying the spatial smoothing technique to array signal processing.

Solution to Problem

An array signal processing apparatus according to the present invention employs a configuration to include: an array antenna formed with four antennas that are arranged on four vertices of a parallelogram, respectively; a correlation calculation section that calculates spatial correlation matrices for each of a first subarray antenna formed with two antennas arranged on two vertices facing each other out of the four vertices and one of the antennas other than the two antennas, and a second subarray antenna formed with the two antennas and the other one of the antennas other than the two antennas, based on reception signals; a conversion section that converts a first spatial matrix out of the calculated two spatial matrices into a complex conjugate; and a spatial smoothing section that determines the arithmetic mean of the complex conjugate of the first spatial matrix and a second spatial matrix.

Advantageous Effects of Invention

According to the present invention, it is possible to provide an array signal processing apparatus that can use the spatial smoothing technique and reduce the number of constituent antennas of an array antenna at the same time, when applying the spatial smoothing technique to array signal processing.

DESCRIPTION OF EMBODIMENTS

[Theory about Array Reception Signal and Spatial Correlation]

<Direction Manifold of Circular Array>

As described above, it is possible to estimate the arrival direction ($\phi$, $\theta$) of a wave with respect to a hemispherical plane by using an array antenna arranged in a planar manner, such as a circular array. $\phi$ represents the azimuth in the same plane (xy plane) as the plane of an array antenna, and $\theta$ represents the elevation when the perpendicular direction to that plane is the z axis.

Figure 1:
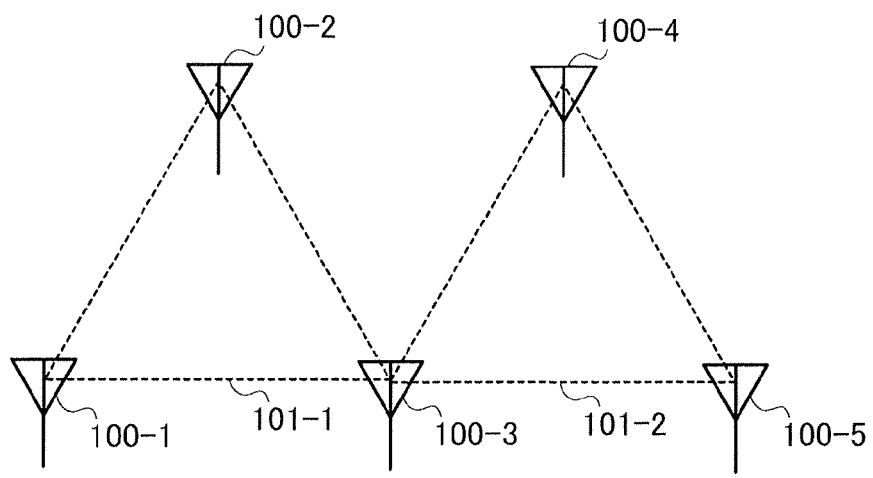
FIG. 1 shows an array antenna disclosed in Patent Literature 1.
Figure 2:
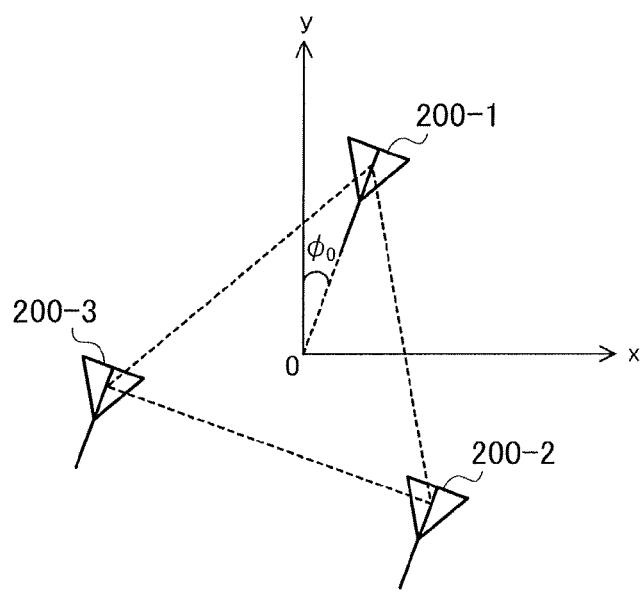
FIG. 2 shows a direction manifold.

The minimum configuration of a planar array that can estimate the arrival direction ($\phi$, $\theta$) is equilateral triangular array 20 formed with three antennas 200-1 to 200-3 as shown in FIG. 2.

Here, when each antenna 200 has ideal omni directivity (having the even complex radiation pattern), antenna 200 is arranged on each vertex of a equilateral triangle having a side of length of $d_0$, and the center of that equilateral triangle is the phase center of an arriving wave, two dimensional direction manifold $a_3$ ($\phi$, $\theta$) for equilateral triangular array 201 can be represented by equation 1. Here, $\phi_0$ is a parameter indicating a rotational angle of azimuth of equilateral triangular array 20 with respect to the y axis.

(Equation 1)

$$a_3(\phi, \theta) = \begin{bmatrix} \exp(j \cdot k \cdot \cos(\phi - \phi_0) \cdot \sin\theta) \\ \exp(j \cdot k \cdot \cos(\phi - \phi_0 - \pi/3) \cdot \sin\theta) \\ \exp(j \cdot k \cdot \cos(\phi - \phi_0 - 2\pi/3) \cdot \sin\theta) \end{bmatrix} \quad [1]$$

Generally, an array manifold indicates a complex response vector with respect to the incoming direction of an arriving wave. Each element of this complex response vector corresponds to each constituent antenna of an array antenna. Here, because an ideal antenna is assumed, in equation 1, the arrival direction is a variable and the relative phase relationship depending on the antenna arrangement is expressed.

Here, when generalizing equation 1 with respect to an equidistant circular array having natural number M antennas, following equation 2 can be obtained.

(Equation 2)

$$a(\phi, \theta) = \begin{bmatrix} \exp(j \cdot k \cdot \cos(\phi - \phi_0) \cdot \sin\theta) \\ \vdots \\ \exp(j \cdot k \cdot \cos(\phi - \phi_0 - (m-1) \cdot \pi/M) \cdot \sin\theta) \\ \vdots \\ \exp(j \cdot k \cdot \cos(\phi - \phi_0 - (M-1) \cdot \pi/M) \cdot \sin\theta) \end{bmatrix} \quad [2]$$

<Array Reception Signal and Spatial Correlation Matrix>

(1) First, a case will be described where waves arriving at an array antenna become two plane waves having no correlation (uncorrelated) between each other.

When two incoming signals to an array antenna are $s_1$ (t) and $s_2$ (t), an array manifold is a ($\phi$, $\theta$), and noise vectors of a plurality of reception processing sequences corresponding to each constituent antenna are N (t), array reception signal vector X (t) can be modelized as shown in equation 3.

(Equation 3)

$$X(t) = s_1(t) \cdot a(\phi_1, \theta_1) + s_2(t) \cdot a(\phi_2, \theta_2) + N(t) \quad [3]$$

Here, equation 3 is a formularization of continuous time domain t, and when this is expressed in discrete time domain i, equation 4 can be obtained. However, in equation 4, L represents the number of samples of discrete time, and X(t) and N(t) represent both complex vectors having the same number of dimensions as the number of antennas forming an array antenna.

(Equation 4)

$$X(i) = s_1(i) \cdot a(\phi_1, \theta_1) + s_2(i) \cdot a(\phi_2, \theta_2) + N(i) \quad [4]$$

i=1, 2 ..., L

Then, correlation matrix $R_{xx}$ in a spatial domain in an array antenna can be estimated by following equation 5, using reception signal vector X (i) represented by discrete time i.

(Equation 5)

$$R_{XX} = E[X(t) \cdot X(t)^H] \approx \frac{\left(\sum_{i=1}^{L} X(i) \cdot X(i)^H\right)}{L} \quad [5]$$

In this $R_{xx}$, diagonal terms indicate autocorrelation in each antenna, and non-diagonal terms indicate cross correlation between antennas. Here, when the number of samples L is large enough, a noise component remains only in the terms representing autocorrelation (i.e. in diagonal terms).

Therefore, when an array antenna subject to determination of correlation matrices is a equilateral triangular array, which is a manifold indicated by equation 1, and when the number of samples L is large enough, correlation matrix $R_{xx}$ can be formulated as shown in following equation 6.

(Equation 6)

$$R_{XX} = A \cdot S \cdot A^H + \sigma^2 I \quad [6]$$

Here, S is represented by following equation 7.

(Equation 7)

$$S = \begin{bmatrix} P_1 & 0 & 0 \\ 0 & P_2 & 0 \\ 0 & 0 & 0 \end{bmatrix} \quad [7]$$

Further, I represents an unit matrix of 3×3, 6 represents the standard deviation of a noise in a receiving sequence, and three sequences of noise components are even.

Further, A is represented by following equation 8.

(Equation 8)

$$A = [a_3(\phi_1, \theta_1) a_3(\phi_2, \theta_2)] \quad [8]$$

Further, $P_1$ and $P_2$ in equation 7 represent average power of incoming signal $s_1$(t) and average power of $s_2$(t), respectively, which are represented by following equations 9 and 10.

(Equation 9)

$$P_1 = E[s_1(t) \cdot s_1(t)^*] \quad [9]$$

(Equation 10)

$$P_2 = E[s_2(t) \cdot s_2(t)^*] \quad [10]$$

As described above, when it is possible to consider that incoming signals $s_1$(t) and $s_2$(t) are uncorrelated, diagonal elements indicating a correlation matrix of an incoming signal are $P_1$, $P_2$, and 0. For example, with the MUSIC method or the ESPRIT method, which are known as partial spatial algorithms, arrival directions of two waves having no correlation are estimated using an orthogonality of an eigen space, which is a partial space of this $R_{xx}$.

(2) When waves arriving at an array antenna becomes two plane waves having correlation between each other.

On the other hand, when arriving waves are two waves with coherence (high correlation), the rank of correlation matrix $R_{xx}$ decreases to one. Under this condition of decrease, only one independent eigenvector is calculated by $R_{xx}$. Therefore, under this condition of decrease, it is difficult to demultiplex two waves to detect the arrival directions.

To take measures against this kind of problem, there is a method of recovering the rank of correlation matrix $R_{xx}$ to "2," that is, there is the spatial smoothing technique for determining the arithmetic mean of correlation matrices of a plurality of subarray antennas, as a technique of demultiplexing a reception signal into each arriving wave component to detect each arriving wave component by suppressing a plurality of coherent arriving waves. See Non-Patent Literature 1 for the detailed description of this spatial smoothing technique. Further, the MUSIC method and the ESPRIT method are also described in detail in Non-Patent Literature 1.

Now, embodiments of the present invention will be described in detail with reference to the accompanying drawings. In embodiments, the same parts will be assigned the same reference numerals and overlapping explanations will be omitted.

Embodiment 1

[Configuration of Array Signal Processing Apparatus]

Figure 3:
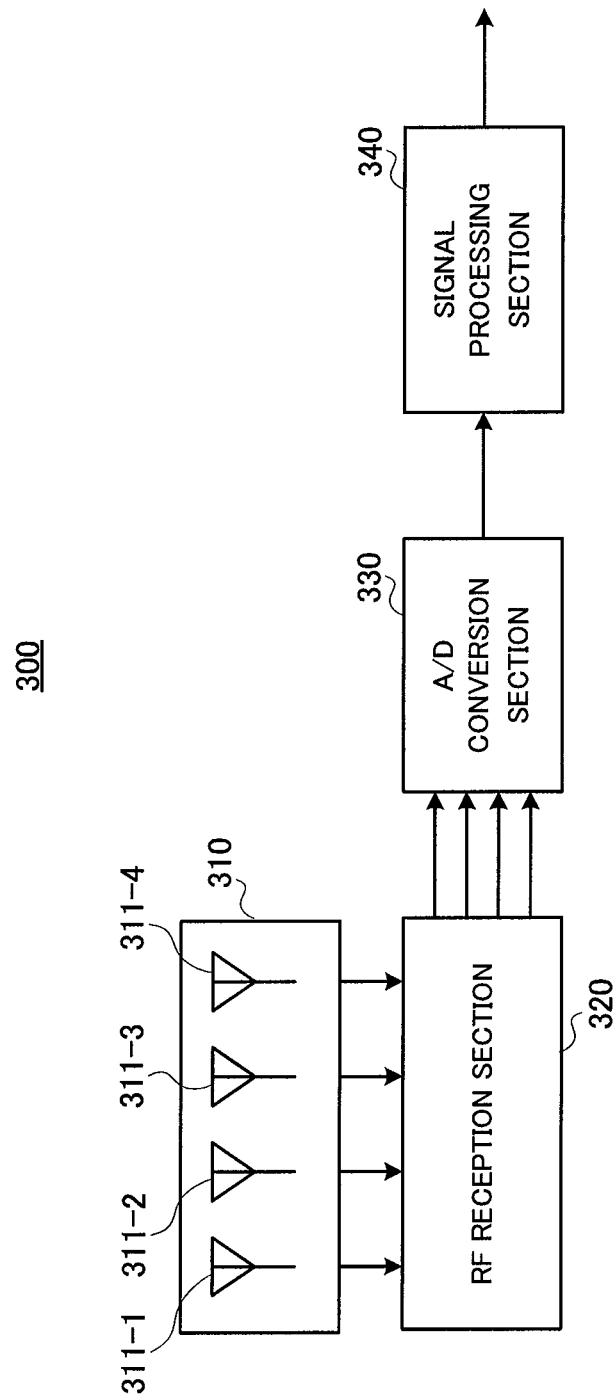
FIG. 3 is a block diagram showing a configuration of an array signal processing apparatus according to Embodiment 1 of the present invention.

FIG. 3 is a block diagram showing a configuration of array signal processing apparatus 300 according to Embodiment 1 of the present invention. In FIG. 3, array signal processing apparatus 300 includes array antenna 310, RF reception section 320, A/D conversion section 330, and signal processing section 340.

Array antenna 310 includes four antennas 311-1 to 4. In array antenna 310, four antennas 311-1 to 4 are arranged on four vertices of a parallelogram, respectively.

Figure 4:
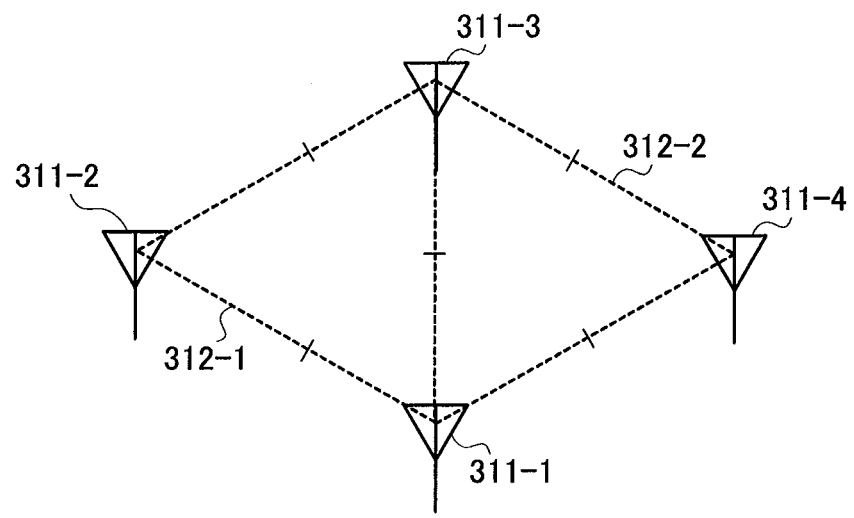
FIG. 4 shows an example of a configuration of an array antenna.

FIG. 4 shows an example of a configuration of array antenna 310. In FIG. 4, four antennas 311-1 to 4 are arranged on four vertices of a parallelogram, respectively. In FIG. 4, a triangle formed by the arrangement position of antennas 311-1 to 3 and a triangle formed by the arrangement position of antennas 311-1, 3, and 4 are each regular triangle. Antennas 311-1 to 3 and antennas 311-1, 3, and 4 form subarray antenna 312-1 and subarray antenna 312-2, respectively.

Array antenna 310 outputs reception signals received from antennas 311-1 to 4 to RF reception section 320.

RF reception section 320 contains a down converter circuit. RF reception section 320 receives as input four sequences of RF reception signals received by four antennas 311-1 to 4, and performs radio reception processing, such as down-conversion and amplification, on each RF reception signal. RF reception section 320 outputs the reception signals obtained by radio reception processing to A/D conversion section 330. The reception signals output to A/D conversion section 330 are four sequences of IF signals or eight sequences of IQ baseband signals.

A/D conversion section 330 receives as input the reception signals output from RF reception section 320 (i.e. four sequences of IF signals or eight sequences of IQ baseband signals), performs discrete time sampling on the input reception signals, and obtains a digital signal by quantizing each sample value. These digital signals can be obtained for each of the four sequences or eight sequences that are associated with antennas 311-1 to 4.

Signal processing section 340 receives as input the digital signal group corresponding to antennas 311-1 to 4 and applies the spatial smoothing technique to this digital signal group, to obtain correlation matrices in which correlation between a plurality of arriving waves arriving at antennas 311-1 to 4 is suppressed. Then, signal processing section 340 calculates the arrival direction of a wave with respect to array antenna 310, based on the correlation matrices in which correlation between arriving waves is suppressed.

Specifically, signal processing section 340 calculates spatial correlation matrices for each of the first subarray antenna formed with two antennas arranged on two vertices facing each other out of the four vertices and one of the antennas other than those two antennas, and the second subarray antenna formed with those two antennas and the other one of the antennas, based on reception signals. Here, the first subarray antenna is subarray antenna 312-1 and the second subarray antenna is subarray antenna 312-2.

Then, signal processing section 340 converts the first spatial correlation matrix out of the calculated two spatial correlation matrices into a complex conjugate, and determines the arithmetic mean of the obtained complex conjugate and the second spatial correlation matrix. By this means, an arithmetic mean determination correlation matrix, in which correlation between arriving waves is suppressed, can be obtained.

Then, signal processing section 340 calculates the arrival direction of the reception signal based on the obtained arithmetic mean determination correlation matrix.

Figure 5:
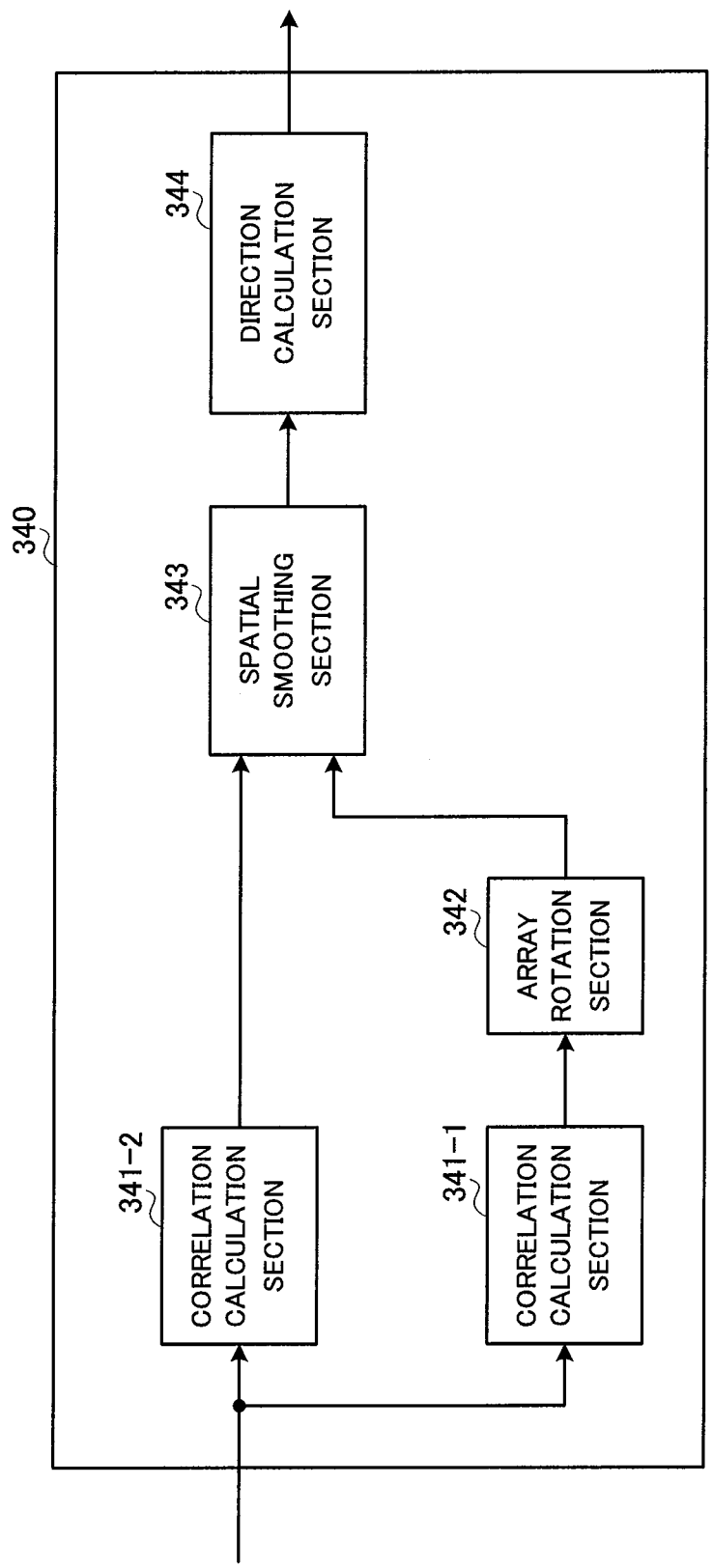
FIG. 5 is a block diagram showing a configuration of a signal processing section.

Specifically, as shown in FIG. 5, signal processing section 340 includes correlation calculation sections 341-1 and 2, array rotation section 342, spatial smoothing section 343, and direction calculation section 344.

Correlation calculation section 341-1 calculates correlation matrix $R_{xx\_1}$ for subarray antenna 312-1, based on the reception signal of each antenna 311 forming that subarray antenna 312-1.

Correlation calculation section 341-2 calculates correlation matrix $R_{xx\_2}$ for subarray antenna 312-2, based on the reception signal of each antenna 311 forming that subarray antenna 312-2.

Array rotation section 342 calculates $R^*_{xx\_1}$, which is the complex conjugate of $R_{xx\_1}$.

Spatial smoothing section 343 calculates mean correlation matrix $R_{xx\_ss}$ by determining the arithmetic mean of $R^*_{xx\_1}$ and $R_{xx\_2}$.

Direction calculation section 344 calculates the arrival direction of a reception wave with respect to array antenna 310, based on mean correlation matrix $R_{xx\_ss}$. Here, processing related to eigenvalue decomposition of a matrix and to the inner product of an array manifold that are required for the MUSIC method or the like is performed.

[Operation of Array Signal Processing Apparatus]

An operation of array signal processing apparatus 300 having the above configuration will be described below.

In array signal processing apparatus 300, correlation calculation section 341-1 calculates correlation matrix $R_{xx\_1}$ related to subarray antenna 312-1. Further, correlation calculation section 341-2 calculates correlation matrix $R_{xx\_2}$ related to subarray antenna 312-2.

Here, as is clear from FIG. 4, there is a positional relationship in which subarray antenna 312-1 and subarray antenna 312-2 do not coincide even when being simply shifted horizontally. Therefore, it is difficult to apply the conventional spatial smoothing technique as is.

Figure 6:
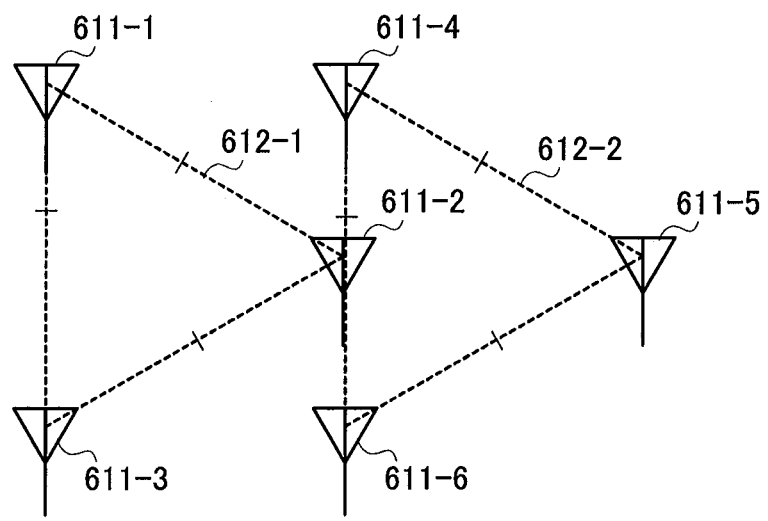
FIG. 6 shows a configuration of an array antenna for which the conventional spatial smoothing technique can be used.

If this conventional spatial smoothing technique is used, in the case of an antenna array containing two equilateral triangle subarray antennas, as is the case with array antenna 310, such an antenna needs to have the configuration represented by array antenna 610 shown in FIG. 6. Array antenna 610 includes subarray antenna 612-1 formed with antennas 611-1 to 3 and subarray antenna 612-2 formed with antennas 611-4 to 6. Then, by shifting subarray antenna 612-1 horizontally, subarray antenna 612-1 can lay over subarray antenna 612-2. Therefore, with array antenna 610, it is possible to expect correlation suppression effects by determining the arithmetic mean of correlation matrix $R_{xx\_3}$ related to subarray antenna 612-1 and correlation matrix $R_{xx\_4}$ related to subarray antenna 612-2.

Here, the forms of array antenna 310 and array antenna 610 will be compared. When comparing the form of array antenna 310 with the form of array antenna 610 in the condition where subarray antenna 312-2 and subarray antenna 612-2 are superposed, subarray antenna 312-1 coincides with subarray antenna 612-1 when being rotated by 180° (i.e. being reversed). This center of rotation matches the center of the circle that passes arrangement positions of all constituent antennas of subarray antenna 312-1.

That is, because it is possible to use correlation matrix $R_{xx\_2}$ for correlation matrix $R_{xx\_4}$, if it is possible to derive correlation matrix $R_{xx\_3}$ from correlation matrix $R_{xx\_1}$, it is possible to use the spatial smoothing technique for array antenna 310 as well.

Therefore, the relationship between correlation matrix $R_{xx\_1}$ and correlation matrix $R_{xx\_3}$ will be discussed below.

First, correlation matrix $R_{xx\_3}$ is formularized. Subarray antenna 612-1 and subarray antenna 612-2 are each regular triangular array antenna, as described above. Therefore, it is possible to apply the array manifold shown in equation 1 to either subarray antenna 612-1 or subarray antenna 612-2. However, the antenna arrangement of FIG. 6 corresponds to a case where the rotation of the azimuth of equilateral triangular array 20 shown in FIG. 2 is $\phi_0 = -30°$.

That is, equation 1 shows that array manifolds related to two subarray antennas which coincides when one of the subarray antennas is reversed, are the complex conjugates each other. That is, $a^*(\theta,\phi)$, which is the complex conjugate of $a(\theta,\phi)$, is an array manifold when reverse (e.g. 180° rotation) is performed.

Further, a reception signal of an array antenna can be modelized as shown in equation 3. With this reason, a reception signal of a reversed equilateral triangular array is represented using $a^*(\theta,\phi)$, which is an array manifold representing the complex conjugate.

That is, correlation matrix $R_{xx\_3}$ is represented by following equation 11.

(Equation 11)

$$R_{XX\_3} = A^* \cdot S \cdot (A^*)^H + \sigma^2 I \quad [11]$$
$$= (A \cdot S \cdot A^H)^* + (\sigma^2 I)^*$$
$$= (A \cdot S \cdot A^H + \sigma^2 I)^*$$
$$= R^*_{XX\_1}$$

As is clear from Equation 11, as a result, correlation matrix $R_{xx\_3}$ becomes the complex conjugate of correlation matrix $R_{xx\_1}$.

Using this relationship, array rotation section 342 calculates $R^*_{xx\_1}$ (i.e. $R_{xx\_3}$), which is the complex conjugate of $R_{xx\_1}$. This processing of calculating the complex conjugate of a correlation matrix in array rotation section 342 is the signal processing that is newly added to the conventional method.

By the way, the correlation matrix used here has features of the Hermitian matrix. Therefore, in this correlation matrix, all diagonal terms are real numbers, and for non-diagonal terms, elements that are located in symmetric positions are the complex conjugates each other. For example, element $r_{12}$ of the first row, second column of correlation matrix R and element $r_{21}$ of the second row, first column are the complex conjugates each other. Therefore, to determine $R^*_{xx\_1}$, which is the complex conjugate of $R_{xx\_1}$, it is necessary to reconfigure $R^*_{xx\_1}$ simply by reading each matrix element configuring $R_{xx\_1}$ in a lateral direction and writing each of the matrix element in a longitudinal direction. In other words, $R^*_{xx\_1}$, which is the complex conjugate of Hermitian matrix $R_{xx\_1}$ can be regarded as $R^T_{xx\_1}$, which is the transpose matrix of $R_{xx\_1}$. This indicates that it is possible to realize processing of array rotation section 342, which constitutes the feature of the present invention, by associating the reading position with the position in which writing is started, from the memory domain storing correlation matrix $R_{xx\_1}$.

Then, spatial smoothing section 343 calculates mean correlation matrix $R_{xx\_ss}$ by determining the arithmetic mean of $R^*_{xx\_1}$ and $R_{xx\_2}$. By this means, it is possible to calculate mean correlation signal $R_{xx\_ss}$ using array antenna 310, which, conventionally, can only be calculated using array antenna 10 or array antenna 610.

Further, when taking into account features of the above-described Hermitian matrix, mean correlation signal $R_{xx\_ss}$ can be expressed as shown in following equation 12.

(Equation 12)

$$R_{XX\_S} = \frac{(R^*_{XX\_1} + R_{XX\_2})}{2} \quad [12]$$
$$= \frac{(R^T_{XX\_1} + R_{XX\_2})}{2}$$

Further, compared to the numbers of antennas forming each of array antenna 10 and array antenna 610, the number of antennas forming array antenna 310 is small.

That is, when array antenna 10, which is a conventional method, is used instead of array antenna 310, RF reception section 320 converts an RF signal received from each of five antennas 100-1 to 100-5 into an IF signal or a baseband signal. This means that five sequences of down converter circuits are required in RF reception section 320.

At this time, in order to accurately estimate correlation matrices used to calculate the direction of an arriving radio wave, it is necessary to use the same local signal source or reference clock source of the above-described five sequences of down converter circuits. At this time, for example, a local signal output from one synthesis section is distributed to five sequences. The circuit realizing this distribution into five sequences not only requires high costs of components but also requires more complex circuit configuration compared to four sequences of distribution circuits, and therefore is not preferred from the viewpoint of practicality.

In addition, A/D conversion section 330 receives as input reception signals output from RF reception section 320 (i.e.

five sequences of IF signals or ten sequences of IQ baseband signals), performs discrete time sampling on the input reception signals, and obtains a digital signal by quantizing each sample value. Likewise, it is necessary to obtain a digital signal for each of five sequences or ten sequences of signals that are associated with antennas 100-1 to 100-5 while securing synchronization of sample timing for five sequences of analog inputs.

Here, a general-purpose A/D conversion apparatus has two sequences or four sequences of input terminals and is often provided in the form of one substrate.

In this way, by reducing the number of required processing sequences from five to four, hardware for processing a reception signal of an array antenna can not only reduce the number of components, but also can have an advantage in development costs in that it is easy to design the circuit or select the substrate.

As described above, according to the present embodiment, it is possible to realize an array antenna processing apparatus that can use the spatial smoothing technique and reduce the number of constituent antennas of an array antenna at the same time, when applying the spatial smoothing technique to array signal processing.

Although a case has been described with the above embodiment where each subarray antenna is a regular triangle, the present invention is not limited to this, and it is also possible to apply the present invention to an array antenna in which four antennas are arranged on verticesvertices of an arbitrary parallelogram, respectively.

Figure 7A:
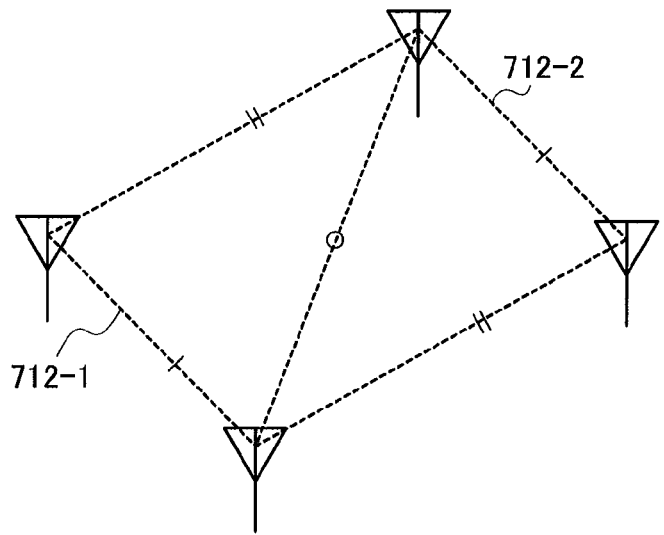
FIG. 7 shows a configuration of an array antenna when subarray antennas are not regular triangles.
Figure 7B:
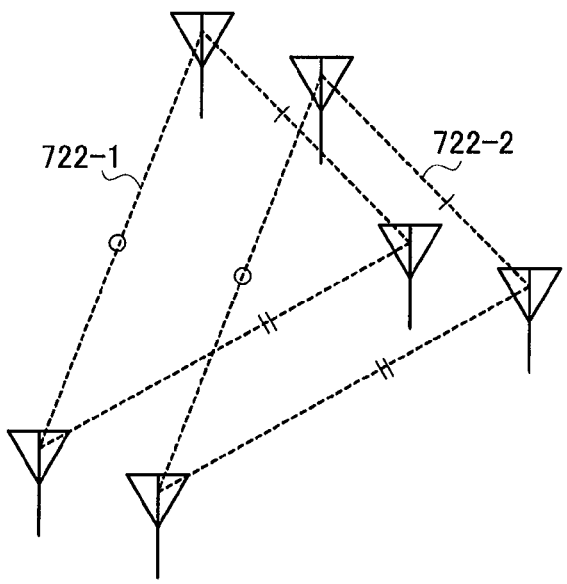

FIG. 7 shows an array antenna when subarray antennas are not regular triangles. In FIG. 7A, array antenna 710 includes subarray antenna 712-1 and subarray antenna 712-2. In FIG. 7B, array antenna 720 includes subarray antenna 722-1 and subarray antenna 722-2. Then, subarray antenna 712-1, subarray antenna 712-2, subarray antenna 722-1, and subarray antenna 722-2 are all congruences. Subarray antenna 712-1 and subarray antenna 722-1 are reversed from each other.

That is, even for subarray antenna 712-1 and subarray antenna 722-1, which are not longitudinal triangles (i.e. constituent antenna arrangement having lower symmetry than the arrangement of a longitudinal triangle), by performing operations performed for the above-described regular triangular subarray antenna 312-1 and subarray antenna 612-1, it is possible to determine the mean correlation matrix using array antenna 710.

Figure 8:
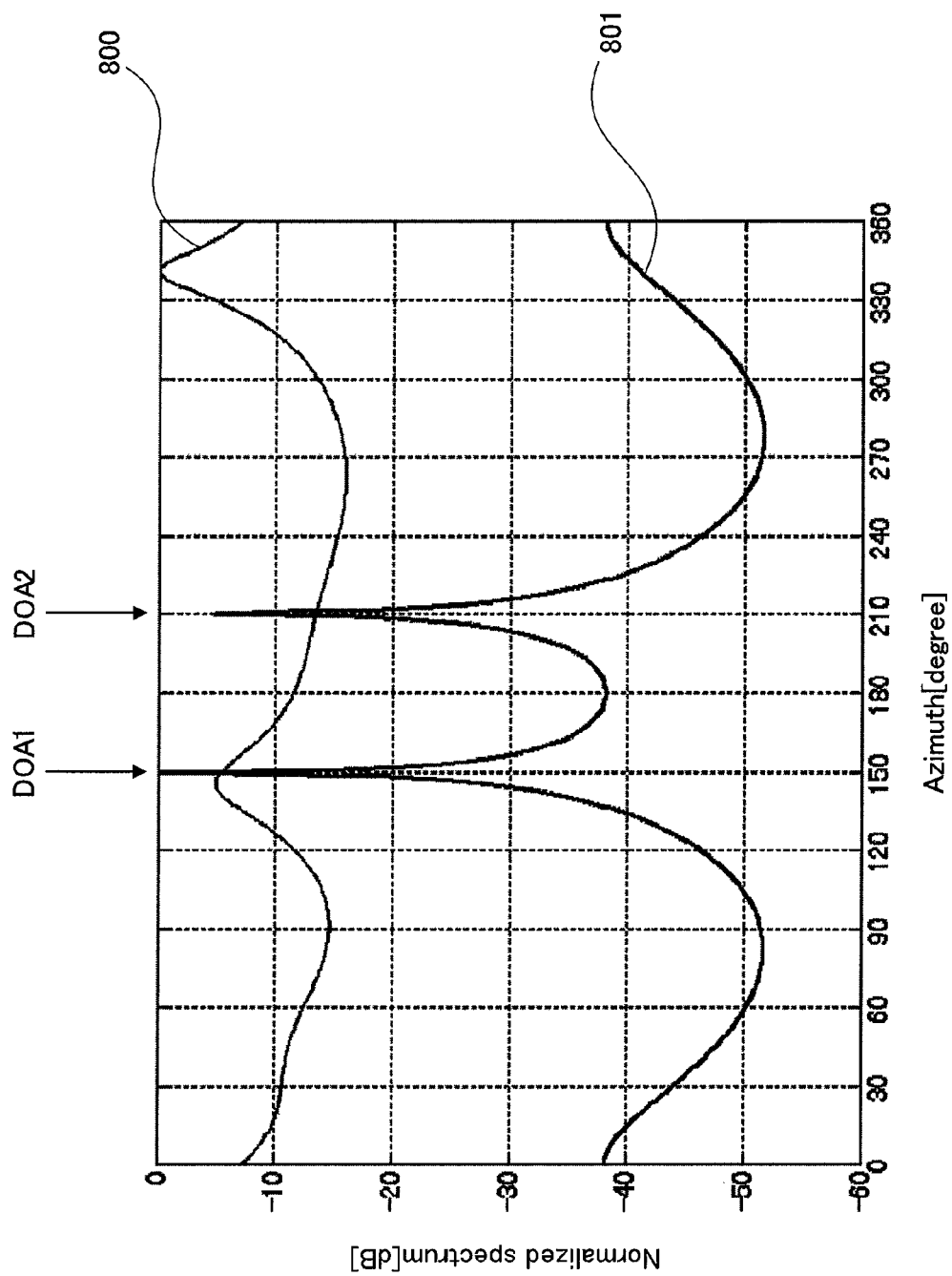
FIG. 8 shows an example of the result of computer simulation for estimating the arrival direction that supports the effects of suppressing correlation between coherent waves shown in the array signal processing apparatus.

Further, FIG. 8 shows an example of the result of computer simulation for estimating the arrival direction that supports the effects of suppressing correlation between coherent waves shown in array signal processing apparatus 300. In FIG. 8, the horizontal axis indicates 360° direction in the horizontal plane (azimuth) on which array antenna 720 is arranged and the vertical axis indicates an angular spectrum estimated by the MUSIC method. Then, the vertical axis is normalized by the maximum value of the spectrum. The conditions of simulation are as follows. Two coherent (here, perfectly correlated) waves arrive from the azimuth of 150° and 210°, and the reception SNR with respect to the arriving wave in the direction of 150° is ten dBs and the reception SNR with respect to the arriving wave in the direction of 210° is four dBs. However, for either of two arriving waves of the azimuth of 150° and 210°, the elevation in the arrival direction is 90°.

In FIG. 8, curve 800 is an angular spectrum calculated when the arrival direction is estimated using subarray antenna 712-2 only. In contrast to this, curve 801 is an angular spectrum calculated when the spatial smoothing processing is performed using both subarray antenna 712-1 and subarray antenna 712-2. In curve 801, pointed peaks appear in the direction of 150° and the direction of 210°. That is, by detecting two peaks appearing in curve 801, it is possible to estimate the arrival direction by demultiplexing a coherent wave.

As described above, when an array antenna containing two subarray antennas is adopted, it is possible to determine an mean correlation matrix by one time of determination of the arithmetic mean. Therefore, in this case, the largest number of arriving waves in which correlation can be suppressed is two. Further, when estimating the arrival direction using the MUSIC method, it is possible to demultiplex the arriving waves of the number obtained by subtracting one from the number of antennas forming the subarray antenna. From the above, it is possible to regard the array antenna that is formed with four antennas and contains two congruent subarray antennas as shown in FIG. 7A, as the minimum configuration of a planar array with which two-dimensional estimation of arrival directions for two coherent waves is possible.

Generally, a monopole antenna or a microstrip antenna is used for an antenna forming an planar array. For example, a monopole antenna shows an even directivity of vertical polarization with respect to the azimuth, but is null in the direction of the z axis. Further, a microstrip antenna is null with respect to the azimuth, but shows the maximum directivity gain in the direction of the z axis. Therefore, which antenna to adopt is determined based on the environment in which the array antenna is mounted or based on the requirements of the system.

Embodiment 2

An specific case where array signal processing apparatus 300 according to Embodiment 1 is applied will be described with Embodiment 2.

Figure 9:
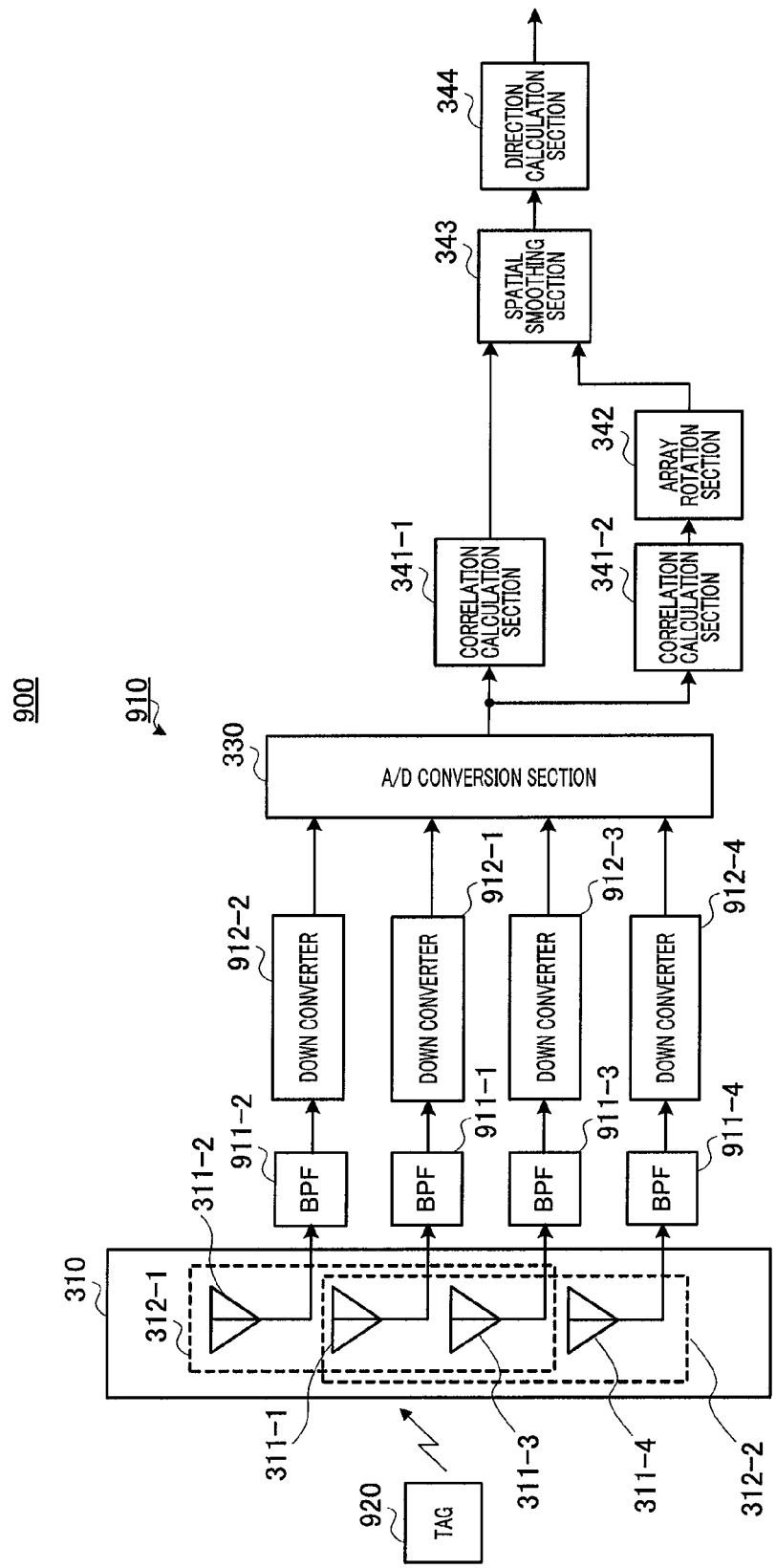
FIG. 9 is a block diagram showing a configuration of a radio communication system according to Embodiment 2 of the present invention.

FIG. 9 is a block diagram showing a configuration of radio communication system 900. In FIG. 9, radio communication system 900 includes radio apparatus 910 and tag 920. In radio communication system 900, radio apparatus 910 transmits an impulse radio-ultra wideband (IR-UWB) pulse signal from a radio transmission section (not shown). Tag 920 transmits a response UWB pulse signal to radio apparatus 910 according to a received UWB pulse signal. It is possible to apply either of the following three methods to this tag 920. The first method is an active method, the second method is a passive method, and the third method is a semi-passive method. The third semi-passive method is a non-synchronous method in which the reference clock of the transmission side of an UWB pulse signal and the reference clock of the reception side do not synchronize. Further, in the third semi-passive method, the reception side transmits a response UWB signal after amplifying a reception UWB signal.

Then, radio apparatus 910 includes a function section corresponding to array signal processing apparatus 300, and estimates the arrival direction of a signal transmitted from tag 920.

In FIG. 9, radio apparatus 910 includes bandpass filters (BPFs) 911-1 to 4 and down converters 912-1 to 4 that correspond to antennas 311-1 to 4.

In radio apparatus 910, antennas 311-1 to 4 are narrowband antennas that receive a partial band of the IR-UWB band.

Here, when estimating the arrival direction of a radio wave, as a fundamental principle, a phase error between antenna sequences is an error of estimation result in estimation of the arrival direction. Therefore, it is necessary to manage the phase error between antenna sequences within a desired error range, by calibration, for example. For this reason, when estimating the arrival direction of a wide band signal such as an UWB pulse, it is necessary to manage the accuracy of a phase for an overall wide band, which, in reality, is difficult. With this reason, in reality, a signal in the narrowest possible band, will be used. The simplest example of a narrow band signal is a single continuous wave (hereinafter referred to as continuous wave, CW) signal contained in an IR-UWB signal. An UWB signal in the IR-UWB method is generated by passing an edge signal of frequency oscillated in the crystal oscillation circuit of the transmission side through a bandpass filter. When, the frequency of a crystal oscillator is 10 MHz, for example, it is expected that an IR-UWB signal is a signal in which CWs are arranged at the interval of 10 MHz, in the band of 3.4 to 4.8 GHz, which is below the UWB, or the band of 7.25 to 10.6 GHz, which is above the UWB. Therefore, in the present embodiment, for example, an IR-UWB signal is treated as a CW of 4 GHz or 9 GHz, and the center frequency of antennas 311-1 to 4 forming array antenna 310 is set at a frequency of 4 GHz or 9 GHz.

Signals received by antennas 311-1 to 4 pass bandpass filters 911-1 to 4, where interference is removed, and then are converted into an IF signal or an IQ baseband signal in down converters 912-1 to 4. In the case of an IF signal, for example, a signal is converted into an IF signal of 10 MHz. In this case, a local signal is a signal that is 10 MHz apart above or below 4 GHz or 9 GHz. Then, it is preferable to use an image rejection mixer as down converter 912 to remove a neighboring image. Further, in the case of an IQ baseband signal, because there is no image signal, a neighboring CW signal is cut by a baseband filter having a cutoff frequency of about 5 MHz in bandpass filter 911. The IF signal or IQ baseband signal that is generated in down converters 912-1 to 4 is converted into a digital signal in A/D conversion section 330 and is input to correlation calculation sections 341-1 and 2.

Correlation calculation section 341-1 calculates correlation matrix $R_{xx\_1}$ for subarray antenna 312-1, based on the reception signal of each antenna 311 forming subarray antenna 312-1. Correlation calculation section 341-2 calculates correlation matrix $R_{xx\_2}$ for subarray antenna 312-2, based on the reception signal of each antenna 311 forming subarray antenna 312-2.

In the case of a UWB pulse signal modulated with the on-off-keying (OOK) scheme, because a UWB pulse signal contains a DC component, generally, covariance is calculated by subtracting the average component of a signal from a correlation matrix. Further, in the case of a UWB pulse signal modulated with the bi-phase scheme, because a UWB pulse signal does not contain a DC component, generally, a correlation matrix is used. A correlation matrix or a covariance matrix is accumulated in a memory in correlation calculation section 341.

Array rotation section 342 calculates $R^*_{xx\_1}$, which is the complex conjugate of $R_{xx\_1}$.

Spatial smoothing section 343 calculates mean correlation matrix $R_{xx\_ss}$ by determining the arithmetic mean of $R^*_{xx\_1}$ and $R_{xx\_2}$.

Direction calculation section 344 calculates the arrival direction of a reception wave with respect to array antenna 310, based on mean correlation matrix $R_{xx\_ss}$. Here, processing related to eigenvalue decomposition of a matrix and to the inner product of an array manifold that are required for the MUSIC method or the like is performed.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

INDUSTRIAL APPLICABILITY

The disclosure of Japanese Patent Application No. 2009-109478, filed on Apr. 28, 2009, including the specification, drawings and abstract, is incorporated herein by reference in its entirety.

An array signal processing apparatus according to the present invention is useful for using the spatial smoothing technique and reducing the number of constituent antennas of an array antenna at the same time, when applying the spatial smoothing technique to array signal processing.

REFERENCE SIGNS LIST

300 Array signal processing apparatus
310, 610, 710, 720 Array antenna
311, 611 Antenna
312, 612, 712, 722 Subarray antenna
320 RF reception section
330 A/D conversion section
340 Signal processing section
341 Correlation calculation section
342 Array rotation section
343 Spatial smoothing section
344 Direction calculation section
900 Radio communication system
910 Radio apparatus
911 Bandpass filter
912 Down converter
920 Tag

The invention claimed is:

1. An array signal processing apparatus comprising:
an array antenna formed with four antennas that are arranged on four vertices of a parallelogram, respectively;
the array antenna including a first subarray antenna and a second subarray antenna that share two antennas arranged on two diagonally-opposing vertices of the parallelogram, the first and second subarray antennas being a reverse of each other,
a correlation calculation section configured to calculate a first spatial correlation matrix based on a reception signal of the first subarray antenna and a second spatial correlation matrix based on a reception signal of the second subarray antenna;
a conversion section configured to convert the first spatial correlation matrix into a complex conjugate; and a spatial smoothing section configured to determine an arithmetic mean of the complex conjugate of the first spatial correlation matrix and the second spatial correlation matrix.

2. The array signal processing apparatus according to claim 1, wherein three antennas forming each subarray antenna are arranged on vertices of an equilateral triangle.

3. The array signal processing apparatus according to claim 1, further comprising a direction calculation section configured to calculate an arrival direction of the reception signals based on the arithmetic mean obtained by the spatial smoothing section.

4. The array signal processing apparatus according to claim 1, including four reception signal processing circuits respectively provided for the four antennas arranged on the four vertices of the parallelogram.

5. The array signal processing apparatus according to claim 4, wherein each of the reception signal processing circuits includes a bandpass filter.

6. The array signal processing apparatus according to claim 4, wherein each of the reception signal processing circuits includes a down converter circuit.

7. The array signal processing apparatus according to claim 1, wherein three antennas forming each subarray antenna are arranged on vertices of an asymmetrical triangle.

8. An array signal processing method used with an array antenna formed with four antennas that are arranged on four vertices of a parallelogram, respectively, the array antenna including a first subarray antenna and a second subarray antenna that share two antennas arranged on two diagonally-opposing vertices of the parallelogram, the first and second subarray antennas being a reverse of each other, the method comprising:

calculating, by a correlation calculation section, a first spatial correlation matrix based on a reception signal of the first subarray antenna and a second spatial correlation matrix based on a reception signal of the second subarray antenna;

converting, by a conversion section, the first spatial correlation matrix into a complex conjugate; and determining, by a spatial smoothing section, an arithmetic mean of the complex conjugate of the first spatial correlation matrix and the second spatial correlation matrix.

9. The array signal processing method according to claim 8, wherein three antennas forming each subarray antenna are arranged on vertices of an equilateral triangle.

10. The array signal processing method according to claim 8, further comprising calculating an arrival direction of the reception signals based on the obtained arithmetic mean.

11. The array signal processing method according to claim 8, further comprising performing four reception signal processing sequences, respectively, for the four antennas of the parallelogram.

12. The array signal processing method according to claim 11, wherein each of the reception signal processing sequences includes bandpass filtering.

13. The array signal processing method according to claim 11, wherein each of the reception signal processing sequences includes down conversion.

14. The array signal processing method according to claim 8, wherein three antennas forming each subarray antenna are arranged on vertices of an asymmetrical triangle.

* * * * *